United States Patent [19]

Dutcher

[11] Patent Number: 4,716,475
[45] Date of Patent: Dec. 29, 1987

[54] READ POST COMPENSATOR CIRCUIT FOR MAGNETIC RECORD/REPRODUCE DEVICE

[76] Inventor: Alan P. Dutcher, 221 Holly Ct., Bensalem, Pa. 19020

[21] Appl. No.: 875,416

[22] Filed: Jun. 17, 1986

[51] Int. Cl.$^4$ .............................................. G11B 5/09
[52] U.S. Cl. ........................................ 360/45; 360/46
[58] Field of Search .................... 375/14, 15; 360/45, 360/46, 65

[56] References Cited

U.S. PATENT DOCUMENTS

| | | | |
|---|---|---|---|
| 3,049,698 | 8/1962 | Thompson et al. | 340/174.1 |
| 3,516,066 | 6/1970 | Jacoby | 340/174.1 |
| 3,696,255 | 10/1972 | King et al. | 307/241 |
| 4,244,008 | 1/1981 | Holt | 360/45 |
| 4,323,932 | 4/1982 | Eibner | 360/45 |
| 4,327,383 | 4/1982 | Holt | 360/45 |
| 4,344,093 | 8/1982 | Huber | 360/45 |
| 4,580,176 | 4/1986 | Graves et al. | 360/45 |

Primary Examiner—Vincent P. Canney
Attorney, Agent, or Firm—Seidel, Gonda, Goldhammer & Abbott

[57] ABSTRACT

A read post compensator circuit for a magnetic record/reproduce device comprises a transducer for reading a sequence of magnetically coded data bits from a magnetic medium and generating an electrical signal representative of the data bits, having a sequence of peak values corresponding to the data bits and having variable time intervals between successive peak values. The circuit has a peak detector to detect the peak values of the electrical signal and a time domain filter for generating output data bits corresponding to detected peak values of the electrical signal and for dynamically varying the interval between successive output data bits in direct relation to the time interval between corresponding peak values to automatically compensate for peak shifting of the electrical signal.

12 Claims, 8 Drawing Figures

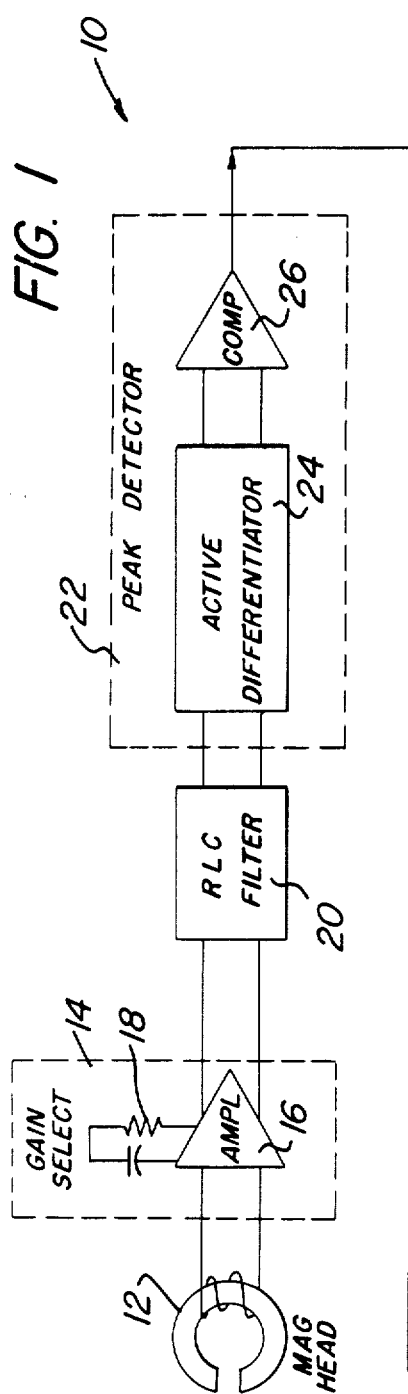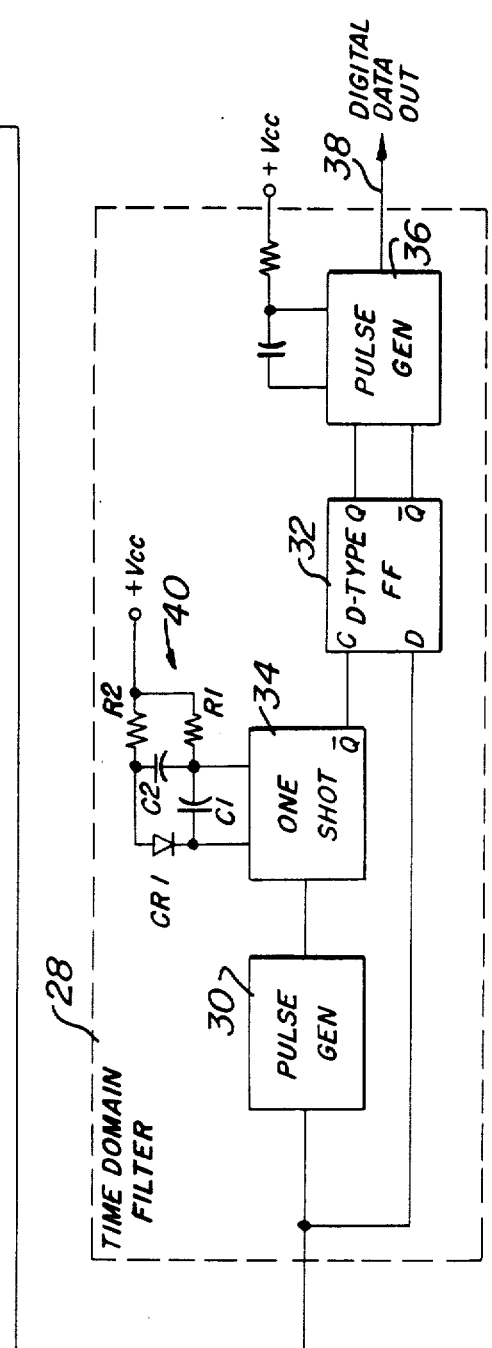
FIG. 1

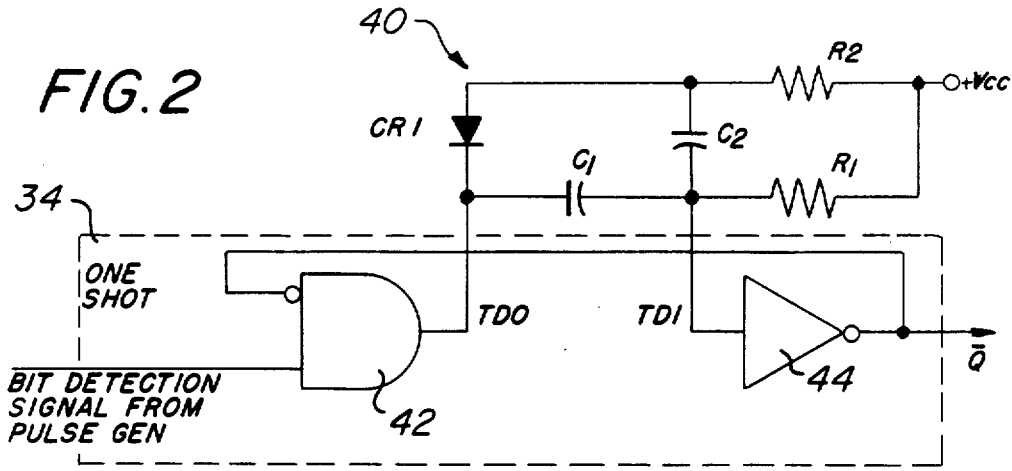
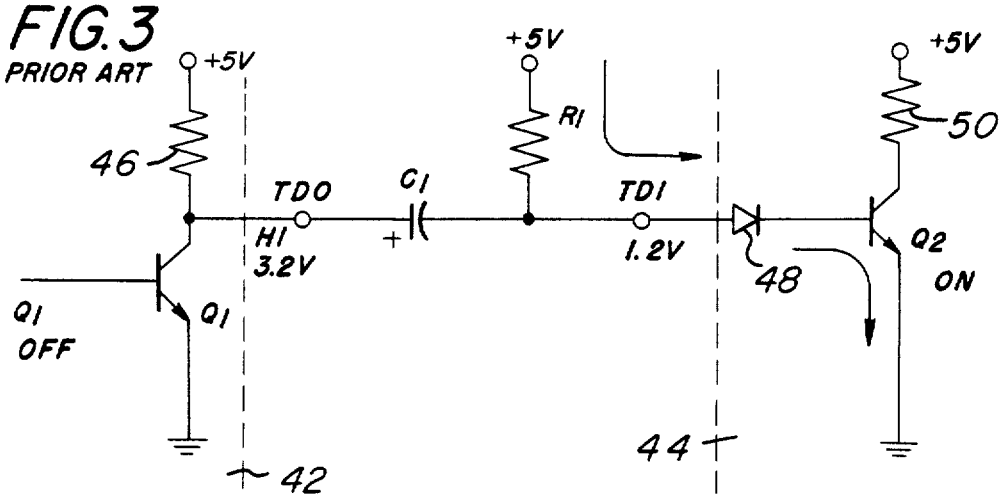
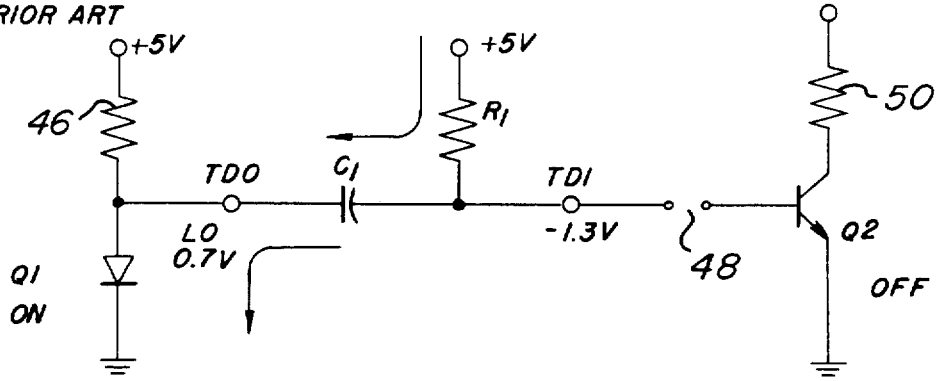

READ POST COMPENSATOR CIRCUIT FOR MAGNETIC RECORD/REPRODUCE DEVICE

BACKGROUND OF THE INVENTION

The present invention relates to read post compensation, also known as bit shift compensation, for the reading of digital data from magnetic media, such as floppy and hard disk and tape drives.

In the recording of digital data on magnetic media, the bits are recorded as flux transitions in the magnetic medium. As bits are recorded close together, as in high bit density recording (especially on the inner tracks of a disk), the flux transitions representing the bits are located very close together on the magnetic medium. In recording, the poles in the medium are aligned so that the north poles are adjacent to one another while the south poles are also adjacent to one another. It is well known from elementary physics that like poles repel. Thus, these like poles tend to cancel one another. Since the recording of data involves changing the spacing between flux reversals, some reversals are closer to one another than others are. Thus, the amount of the cancellation varies within the flux pattern. The closer reversals are cancelled more than the ones further apart. This effect tends to spread the closer reversals further apart while the more widely spaced reversals tend to be bunched more closely together. Thus, the flux transitions do not occur exactly on their nominal locations. When the flux transitions are later read from the magnetic medium, they appear to be displaced in time. This displacement is known as bit shift.

In many cases, the controller for the drive for the magnetic medium is called upon to perform write precompensation to compensate for the bit shift effect. The close flux transitions are called upon to be written closer together while the ones spaced further apart are made even further apart to compensate for the effect described above. This technique is only approximate, however, as the drive controller cannot know exactly how the drive is going to displace the bits on recording.

There is thus a need for a circuit to compensate exactly for bit shift so that exactly the proper amount of compensation can be applied for the drive. This will improve the reliability with which the drive reads the data that were recorded. This could be done on the write side of the drive as well as the read side. However, there usually exists one or more one shot timing circuits in the read chain of these drives that allows for easier implementation of a compensating circuit than in the write side, which usually has no one shot timing circuits.

It is an object of the invention to provide a read post compensator circuit to dynamically vary the period between successive output bits in direct relation to the time interval between successive read bits to compensate exactly for bit shift.

SUMMARY OF THE INVENTION

The present invention is a read post compensator circuit for a magnetic record/reproduce device, and comprises transducer means for reading a sequence of magnetically coded data bits from a magnetic medium and generating an electrical signal representative of the magnetically coded data bits. The electrical signal has a sequence of peak values corresponding to the data bits. The time intervals between successive peak values is variable. The read post compenstor circuit includes a peak detector circuit means for detecting the peak values of the electrical signal and time domain filter means for generating output data bits corresponding to detected peak values of the electrical signal and for dynamically varying the interval between successive output data bits in direct relation to the time interval between corresponding peak values to automatically compensate for peak shifting of the electrical signal.

The invention includes a dynamic bit shift compensator circuit for dynamically varying the time interval between successive output data bits in direct relation to the time interval between corresponding detected magnetically coded data bits in a magnetic record/reproduce device for generating a sequence of output data bits corresponding to a sequence of detected magnetically coded data bits from a magnetic medium. The dynamic bit shift compensator circuit comprises charge storage means for storing amounts of electrical charge proportional to the time interval between successive detected magnetically coded data bits, circuit means responsive to the charge storage means for generating a gating signal when the amount of electrical charge stored in the charge storage means reaches a predetermined value, the time interval between successive gating signals being dynamically variable by the circuit means in direct relation to the time interval between corresponding detected magnetically coded data bits, and circuit means responsive to the gating signals for causing the output data bits to be output from the magnetic record/reproduce device in synchronism with the gating signals.

The invention further comprises a method of dynamically varying the time interval between successive output data bits in a magnetic record/reproduce device for generating a sequence of output data bits corresponding to a sequence of detected magnetically coded data bits from a magnetic medium, and comprises the steps of storing amounts of electrical charge proportional to the time interval between successive detected magnetically coded data bits, generating a gating signal when the amount of electrical charge stored reaches a predetermined value, causing the time interval between successive gating signals to dynamically vary in direct relation to the time interval between corresponding detected magnetically coded data bits, and causing the output data bits to be output from the magnetic record/reproduce device in synchronism with the gating signals.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a simplified block diagram of a typical floppy disk read chain including the read post compensator circuit according to the present invention.

FIG. 2 is a portion of the circuit of FIG. 1, showing a dynamic bit shift compensator circuit in accordance with the present invention in greater detail.

FIGS. 3–7 are equivalent-circuit schematic diagrams which illustrate the operation of the present invention.

DETAILED DESCRIPTION OF THE INVENTION

Figure 5:
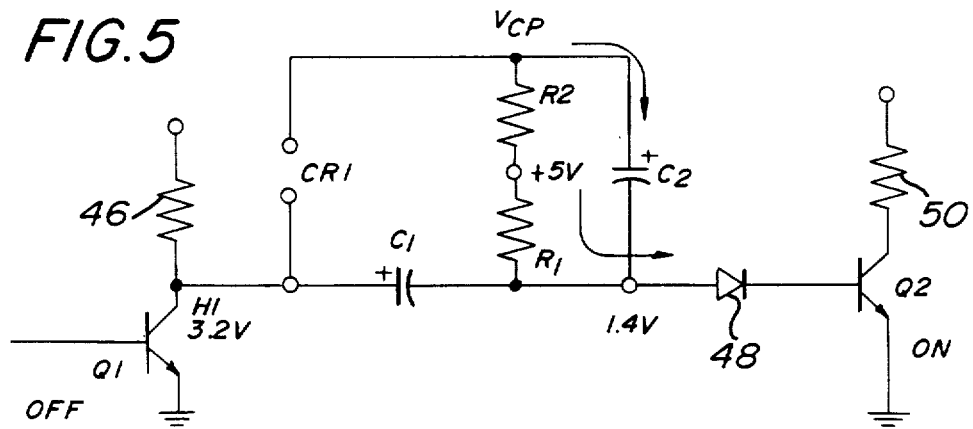

Referring to the drawings, wherein like numerals indicate like elements, there is shown in FIG. 1 a read post compensator circuit 10 in accordance with the present invention. Data stored in the form of magnetically coded bits on a magnetic medium is read by transducer 12, which is a magnetic read/write head. The magnetic medium may be any suitable medium such as magnetic tape or floppy or hard disks. As will be readily understood by those skilled in the art, transducer 12 generates a differential AC signal in response to detection of magnetically coded bits on the magnetic medium. The differential AC output of transducer 12 is amplified by amplifier stage 14, which includes a differential amplifier 16. The gain of differential amplifier 16 is set by a gain select network 18.

The amplified output of transducer 12 is then filtered by passive filter network 20. The amplified filtered signal is then sent to peak detector 22 which detects each peak of the amplified, filtered differential AC signal from the transducer 12. The peak detector comprises an active differentiator 24 and a comparator 26, which together generate a pulse corresponding to each peak of the differential AC signal. The pulse output from peak detector 22 is then sent to time domain filter 28.

The input pulses to time domain filter 28 are sent to both pulse generator 30 and to the D input of D-type flip flop 32. Pulse generator 30 generates an output pulse for each input pulse, and the output pulses generated by pulse generator 30 are input to one-shot 34, which acts as a timer that delays the clocking of an output pulse from pulse generator 30, and thus a detected bit, through D-type flip flop and out through pulse generator 36 as an output data bit on line 38. The timing of one-shot 34 is controlled by timing network 40.

A portion of the circuitry of one-shot 34 is shown in FIG. 2 in conjunction with timing network 40. As shown in FIG. 2, the output pulses from pulse generator 30 are applied to the non-inverting input of AND gate 42 within one-shot 34. The output (designated TDO) of AND gate 42 is capacitively coupled by capacitor C1 to the input (designated TDI) of inverter 44, also part of one-shot 34. The output of inverter 44 forms the $\overline{Q}$ output of one-shot 34, which is the clocking input to D-type flip flop 32. The output of inverter 44 is also fed back to the inverting input of AND gate 42.

The way in which timing network 40 operates to delay the clocking of detected bits and compensate for bit shift will now be described, first with reference to the prior art and then with reference to the present invention.

As already noted, the timing period of one-shot 34 is determined by timing network 40. In the prior art, timing network 40 consists only of capacitor C1 and resistor R1. The TDO output of AND gate 42 is typically a TTL type totem pole output, and drives capacitor C1. The TDO output of AND gate 42 normally sits high (3.2 V) and is triggered low (0.7 V) upon the detection of a bit crossing at the active differentiator 24. It will remain low for the duration of the timing as set by timing components R1 and C1. At the end of this timing period, the $\overline{Q}$ output of the one-shot 34 will trigger D-type flip flop 32, and the read data bit will be clocked out of pulse generator 36 on line 38. Thus, the read data bit is delayed by the timing period of one-shot 34. Both the negative and positive crossings at active differentiator 24 will trigger one-shot 34, so that both polarities of flux change will detect bits.

Referring to FIG. 3, there is shown a simplified equivalent circuit of the prior art timing network. In FIG. 3, the circuit is shown for the condition between detected crossings, i.e., when the TDO output of AND gate 42 is high. The output stage of AND gate 42 is represented in FIG. 3 by transistor Q1 and collector resistor 46. Since the TDO output of AND gate 42 is high, Q1 is off, and appears essentially as an open circuit. The input stage of inverter 44 is represented by diode 48, transistor Q2 and resistor 50. As can be determined from inspection of FIG. 2, when Q1 is off, Q2 will be on, and will appear essentially as a forward-biased diode. Thus, when the circuit is in the condition shown in FIG. 3, current will flow in the direction indicated by the arrow, i.e., from the +5 V supply through R1 and then through diode 48 and transistor Q2.

When a bit is detected, Q1 is turned on, and the TDO output of AND gate 42 drops low. This condition of the circuit is shown in FIG. 4. Since Q1 is on, it will appear as a forward-biased diode. The voltage at the TDO output of AND gate 42 will drop from 3.2 V to 0.7 V, a drop of 2.5 V. Since the output of AND gate 42 is capacitively coupled to the TDI input of inverter 44, when the output of AND gate 42 drops from 3.2 V to 0.7 V, the input to inverter 44 will also drop, from +1.2 V to −1.3 V (1.2 V−2.5 V=−1.3). This drop in the voltage at the TDI input of inverter 44 will reverse bias diode 48, which will now appear to be an open circuit, and will also turn Q2 off. C1 now discharges through Q1, and current flows through R1, C1 and transistor Q1 to ground.

When the current flowing through R1, C1 and Q1 charges C1 to 1.2 V on the side connected to the TDI input to inverter 44, diode 48 will again become forward biased, and thus clamp the TDI input of inverter 44 to 1.2 V. This will also turn Q2 on again. Because the output of inverter 44 is coupled to the inverting input of AND gate 42, when Q2 is turned on, Q1 will be turned off, returning the TDO output of AND gate 42 to the high state of 3.2 V. When Q2 is turned on, D-type flip flop 32 is clocked, and an output data bit will appear on digital data output line 38.

It will be appreciated that a detected crossing at the differentiator, i.e., a detected data bit, is thus delayed by one-shot 34 for a period of time equal to the charging time period of R1 and C1. This time period is known to be 0.625 R1 C1, measured in seconds.

It will also be appreciated that the amount of delay is fixed by the values of R1 and C1. That is, one-shot 34 provides a fixed delay in clocking detected data bits through to digital data output line 38, regardless of the actual amount by which a detected bit has been shifted. Thus, R1 and C1 provide a fixed (i.e., not dynamically variable) amount of delay. However, bit shift is not fixed, because when flux transitions are recorded onto the magnetic medium, transitions that are closer together tend to partially influence or cancel one another. Thus the close transitions are caused be spaced farther apart than they were actually recorded. To compensate for this difference, the transitions spaced further apart in the dictated data must appear to move closer together to keep the long term timing the same as in the recorded data. This is the essence of bit shift compensation. Also, the transducer 12, when reading the data, tends to lose a small amount of resolution, thus adding to the shifting effect. If the period of one-shot 34 in time domain filter 28 could be altered dynamically, it would alter the instant when a detected bit was clocked out by D-type flip flop 32 to digital data output line 38. If this dynamic compensation can be made to operate exactly opposite to the bit shift in the recorded data, a complete cancellation of the bit shift can be accomplished.

This dynamic compensation is achieved in the present invention by adding to the one-shot timing circuit 40 a diode CR1 and an additional resistor R2 and capacitor C2, connected as shown in FIGS. 1 and 2. These three additional components form a charging circuit whose time constant alters the timing period of the one-shot 34, and hence the delay that the actual read bit is subjected to. The amount of charge accumulated by capacitor C2 is proportional to the amount of time that has elapsed since the last flux transition. As a result, the delay of the detected bits is longer for longer shift times and shorter for shorter shift times. This makes short bit intervals closer and longer bit intervals longer at digital data output line 38. That is, the period between successive output data bits is dynamically varied in direct relation to the time intervals between detected data bits. This is directly opposite to the effects of bit shift, and compensates for it.

Operation of the circuit according to the invention will now be described with reference to FIGS. 5–8.

FIG. 5 is a simplified equivalent circuit diagram in the state between detected crossings at the differentiator 24. In the state shown in FIG. 5, Q1 is off, as in FIG. 3. Since Q1 is off, no current flows through Q1 and, therefore, no current can flow through CR1. Thus, CR1 and Q1 appear as an open circuit. As in FIG. 3, current will flow from the +5 V supply through R1, diode 48 and transistor Q2. However, current will also flow from the +5 V supply through R2 to charge C2. Capacitor C2 will thus charge toward +5 V on the positive side of C2. The charging time constant of R2 C2 is chosen to be very long compared to the charging time constant of R1 C1, so that C2 charges toward +5 V between detected crossings but never reaches +5 V. Thus, the amount of charge accumulated on C2 will be proportional to the time between detected bits.

Figure 6:
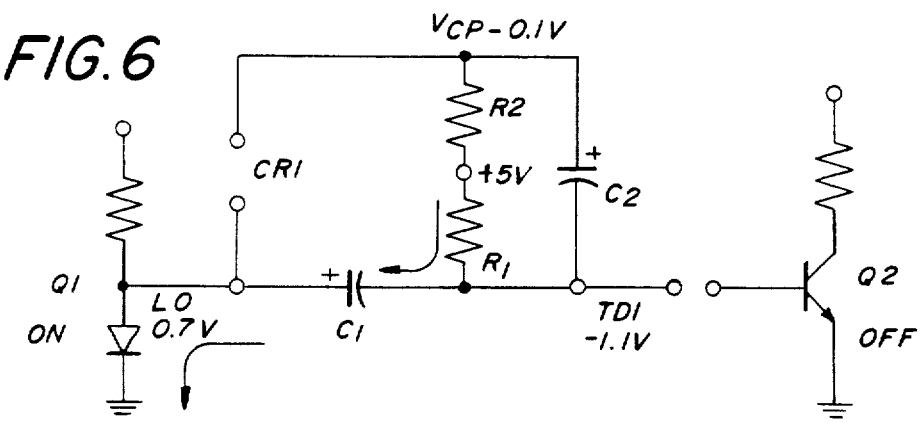
Figure 7:
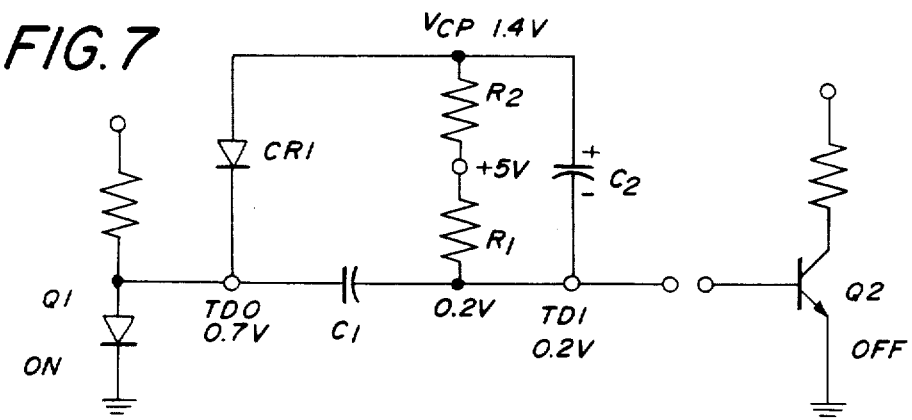

When the next bit is detected, Q1 will turn on, and the state of the circuit will be as shown in FIG. 6. The TDO output of AND gate 42 will drop from 3.2 V to 0.7 V, a drop of 2.5 V. Because the TDO output of AND gate 42 is capacitively coupled through C1 to the TDI input of inverter 44, the TDI input of inverter 44 will drop from 1.2 V to −1.3 V. In addition, since the connection point VCP between R2 and C2 is capacitively coupled via C2 to the input of inverter 44, the voltage at VCP will also drop by 2.5 V.

The resulting voltage at VCP will depend upon the amount of charge accumulated on C2 between detected bits. For purposes of illustration, it is arbitrarily assumed that the amount of charge on C2 is sufficient to cause VCP to be +2.4 V before the next detected bit. Thus, when the next bit is detected, VCP will drop from +2.4 V to −0.1 V. At that point, CR1 remains reversed biased, and C1 charges through Q1 and R1. Because the R1 C1 time constant is relatively short, C1 charges quickly. As C1 begins to charge, the DC voltage on the R1 side of C1 will rise. Because this point is capacitively coupled to VCP, VCP will rise as well. When VCP reaches +1.4 V, the voltage at the TDI input of inverter 44 will have reached only +0.2 V, and Q2 will remain off. However, when VCP reaches 1.4 V, CR1 will become forward biased, and the circuit will be in the state shown in FIG. 7. When CR1 becomes forward biased, C2 will discharge through CR1 and Q1 and R1. While C2 is discharging, VCP is clamped at +1.4 V via CR1 and Q1.

The charge on C2 does influence the amount of time it takes for VCP to reach +1.4 V. That is, the more voltage on C2, the closer VCP is to reaching +1.4 V, and the sooner VCP will reach +1.4 V. But because of the short time constant of R1 C1, this influence is to be considered negligible.

Figure 8:
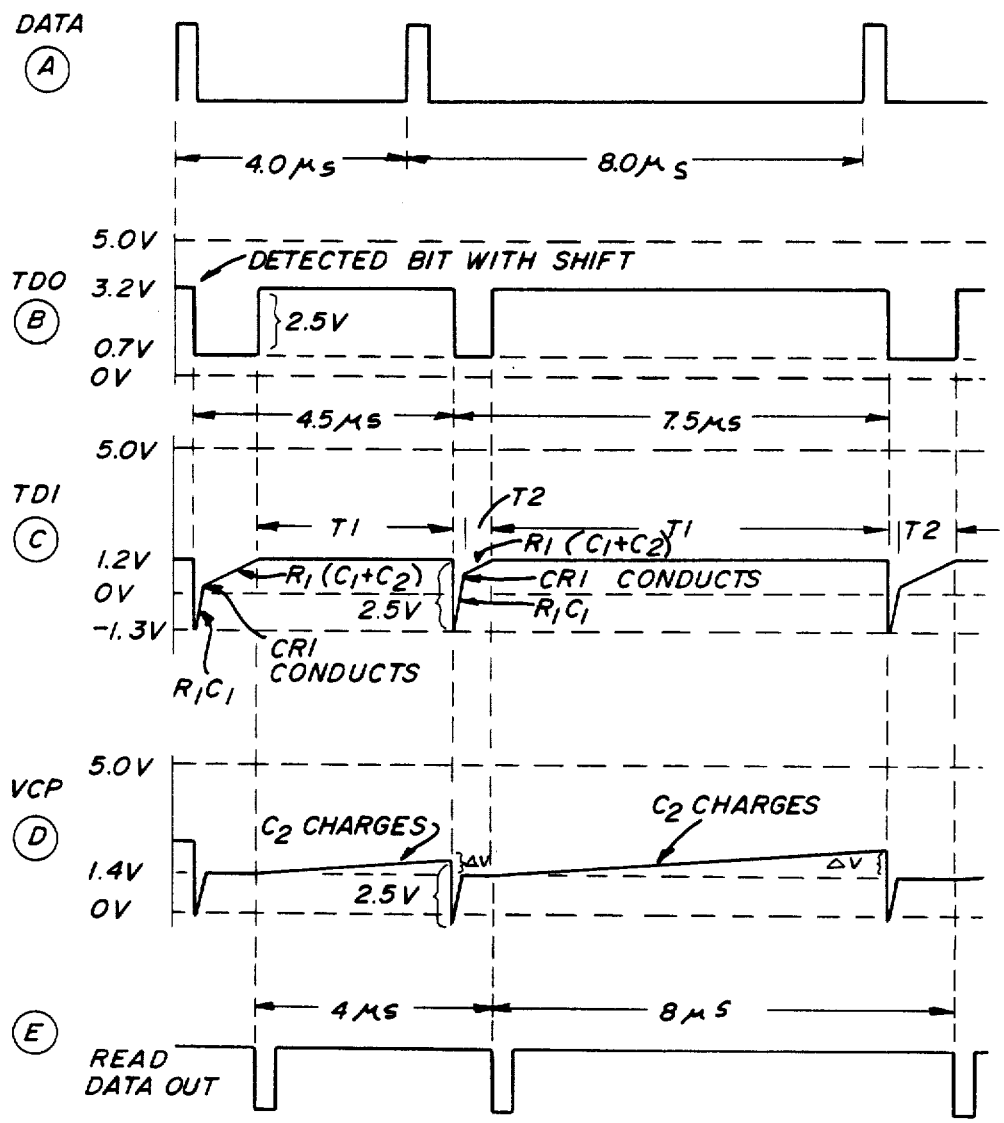
FIG. 8 consisting of A through E is a timing diagram for the circuit of the present invention.

Referring now to the timing diagram in FIG. 8, if the time between bits is long, C2 will receive more charge during that interval. Thus the voltage across C2 (called $\Delta V$ in FIG. 8, wave form D) will be higher than for a short bit interval. Thus, when VCP reaches +1.4 V, and diode CR1 conducts, the $\Delta V$ in C2 must be discharged by R1 in order for the voltage on the TDI input to the inverter 44 to reach the +1.2 V level required to terminate the timing period of one shot 34 and clock the detected bit to D-type flip flop 32 which triggers one shot 36 to produce a data bit at the digital interface 38. Thus the interval between clocked data bits is increased to add to the greater spacing between detected bits.

If the time between bits is short, C2 will receive less charge during that interval. Thus the voltage across C2 (called $\Delta V$ in FIG. 8, waveform D) will be lower than for a long bit interval. Thus, the interval between clocked data bits is decreased to subtract from the lesser spacing between detected bits.

Thus the shorter bit intervals are made even shorter and the longer bit intervals are made even longer. This effect is in direct opposition to the effects of bit shift as described above and effectively compensates for it.

The dynamic compensation achieved by the circuit according to the invention is illustrated in the timing diagrams in FIG. 8. Waveform A represents three data bits which are to be spaced as shown. Waveform A can be thought of as the data before recording. Waveform B illustrates the detected bits (leading edge) along with the amount of bit shift. Waveform B is the waveform at the TDO output of AND gate 42, and shows that the bits which are closer together have been shifted apart, from 4.0 us to 4.5 us, while the bits spaced further apart have been shifted together from 8.0 us to 7.5 us. Waveform C represents the waveform at the TDI input to inverter 44, while waveform D represents the waveform at VCP. Waveform E represents the read data which are clocked out onto digital data output line 38.

As seen from waveform A, a sequence of three bits are to be recorded on the magnetic medium, the first two bits being spaced by an interval of 4.0 us and the second and third bits being spaced by an interval of 8.0 us. When these bits are recorded on the magnetic medium, the first and second bits being relatively closely spaced, will tend to shift apart, while the second and third bits, being less closely spaced, will tend to shift together. This effect is shown in waveform B. It can be seen in waveform B that the first and second detected bits are now spaced by an interval 4.5 us, while the second and third detected bits are spaced by an interval of only 7.5 us.

A fixed amount of delay, and thus a fixed amount of bit shift compensation, is provided by the R1 C1 portion of timing network 40. The fixed portion of the time delay is illustrated on waveform C as the portion of the curve labeled R1 C1. This portion of the curve represents the charging of capacitor C1. As seen in waveform C, there is a break in the curve at the point were diode CR1 begins to conduct. The time during which CR1 will conduct will vary depending on the amount of charge accumulated on C2 between bits. This charge is represented in waveform D as ΔV. As already described, ΔV is proportional to the amount of time between detected bits. Once CR1 begins to conduct, both C1 and C2 begin to charge, and will continue to charge until TDI reaches 1.2 V, at which point the detected bit will be clocked out as waveform E. It can be seen from the timing diagrams that the effects of bit shift are exactly compensated for, and the proper spacing between read data bits is accurately restored.

The present invention may be embodied in other specific forms without departing from the spirit or essential attributes thereof and, accordingly, reference should be made to the appended claims, rather than to the foregoing specification, as indicating the scope of the invention.

What is claimed is:

1. A read post compensator circuit for a magnetic record/reproduce device comprising:
   (a) transducer means for reading a sequence of magnetically coded data bits from a magnetic medium and generating an electrical signal representative of the magnetically coded data bits, the electrical signal having a sequence of peak values corresponding to said data bits, the time intervals between successive peak values being variable,
   (b) peak detector circuit means for detecting the peak values of the electrical signal, and
   (c) time domain filter means for generating output data bits corresponding to detected peak values of the electrical signal and for dynamically varying the period between successive output data bits in direct relation to the time interval between corresponding peak values to automatically compensate for peak shifting of the electrical signal, the time domain filter having holding circuit means for holding successive peak values for a variable time interval and timing circuit means for generating a sequence of gating signals, the time interval between successive gating signals being dynamically variable in direct relation to the time interval between corresponding magnetically coded data bits, the holding circuit means being responsive to the gating signals for generating an output data bit upon the occurrence of a gating signal.

2. A circuit according to claim 1, wherein the magnetic record/reproduce device comprises a disk drive.

3. A circuit according to claim 1, wherein the disk drive is a floppy disk drive.

4. A circuit according to claim 1, wherein the transducer means is a magnetic head.

5. A circuit according to claim 1, further comprising amplifier means following the transducer means for amplifying the electrical signal before the signal is input to the peak detector means.

6. A circuit according to claim 5, further comprising passive filter means following said amplifier means for filtering the amplified electrical signal before the signal is input to the peak detector means.

7. In a magnetic record/reproduce device for generating a sequence of output data bits corresponding to a sequence of detected magnetically coded data bits from a magnetic medium, a dynamic bit shift compensator circuit for dynamically varying the time interval between successive output data bits in direct relation to the time interval between corresponding detected magnetically coded data bits, comprising:
   (a) charge storage means for storing amounts of electrical charge proportional to the time interval between successive detected magnetically coded data bits,
   (b) circuit means responsive to the charge storage means for generating a gating signal when the amount of electrical charge stored in the charge storage means reaches a predetermined value, the time interval between successive gating signals being dynamically variable by said circuit means in direct relation to the time interval between corresponding detected magnetically coded data bits, and
   (c) circuit means responsive to the gating signals for causing the output data bits to be output from the magnetic record/reproduce device in synchronism with the gating signals.

8. A circuit according to claim 7, wherein the charge storage means comprises a capacitor.

9. A circuit according to claim 7 wherein the first mentioned circuit means comprises a one-shot multivibrator.

10. A circuit according to claim 7 wherein the second mentioned circuit means comprises a flip-flop circuit.

11. A method of dynamically varying the time interval between successive output data bits in a magnetic record/reproduce device for generating a sequence of output data bits corresponding to a sequence of detected magnetically coded data bits from a magnetic medium, comprising the steps of:
   (a) storing amounts of electrical charge proportional to the time interval between successive detected magnetically coded data bits,
   (b) generating a gating signal when the amount of electrical charge stored reaches a predetermined value,
   (c) causing the time interval between successive gating signals to dynamically vary in direct relation to the time interval between corresponding detected magnetically coded data bits, and
   (d) causing the output data bits to be output from the magnetic record/reproduce device in synchronism with the gating signals.

12. A method according to claim 11, wherein the step of storing amounts of electrical charge comprises storing amounts of electrical charge in a capacitor.

* * * * *

UNITED STATES PATENT AND TRADEMARK OFFICE
CERTIFICATE OF CORRECTION

PATENT NO. : 4,716,475

DATED : December 29, 1987

INVENTOR(S) : Alan P. Dutcher

It is certified that error appears in the above—identified patent and that said Letters Patent is hereby corrected as shown below:

Add the following to the cover sheet of the patent:

[73] Assignee: Oki America, Inc., Hackensack, N.J.

Signed and Sealed this

Seventh Day of June, 1988

Attest:

DONALD J. QUIGG

Attesting Officer

Commissioner of Patents and Trademarks